United States Patent Office 3,259,501
Patented July 5, 1966

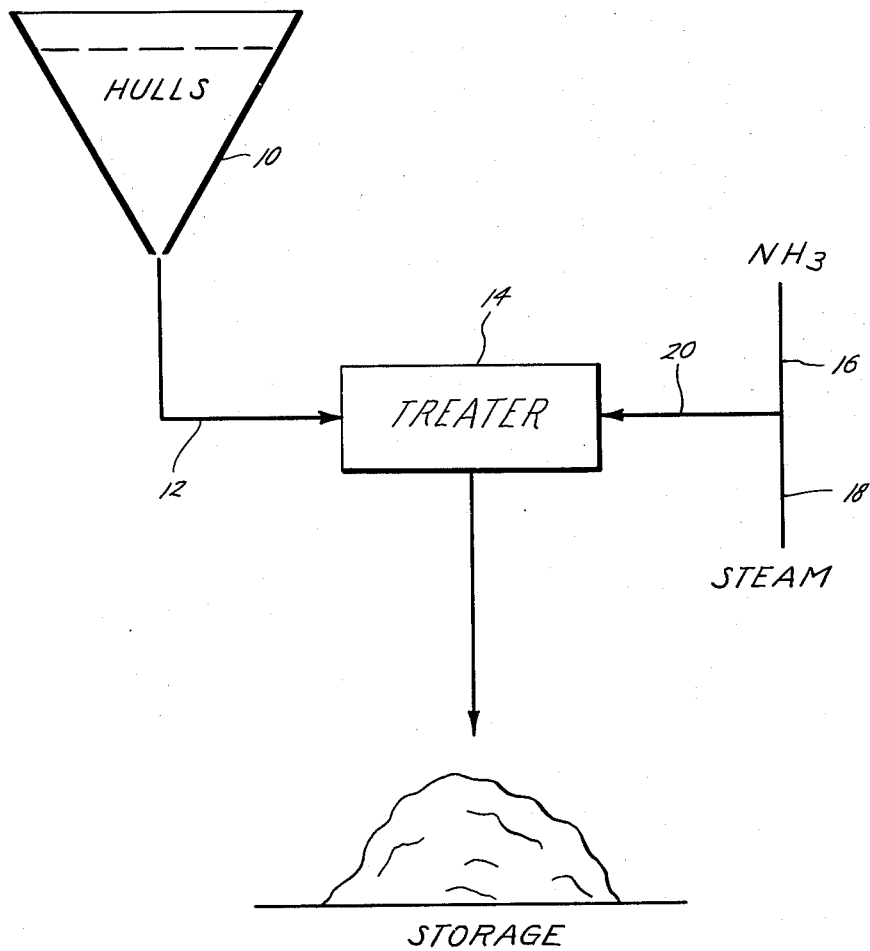

3,259,501
RICE HULL PRODUCTS AND METHOD
David George Ulrey, Martin County, N.C., assignor to Delta Industries, Inc., Houston, Tex., a corporation of Texas
Filed June 11, 1964, Ser. No. 375,422
29 Claims. (Cl. 99—2)

The present application is a continuation-in-part of my preceding application Serial No. 228,769, filed October 5, 1962, now abandoned, which was a continuation-in-part of my application Serial No. 182,838 filed March 27, 1962, now abandoned.

The present invention relates to a process of treating hulls by which products are obtained for use as livestock feed, fertilizer, and other useful purposes. More particularly, the present invention relates to a process of treating rice hulls thereby transforming the rice hulls into useful products, such as livestock feed, fertilizer and other useful products.

At the present time rice hulls are generally considered a waste product. Thousands of tons of rice hulls are hauled to the dumps each week. Companies pay large sums each year just to dispose of these rice hulls. Rice hulls are light in weight and do not have sufficient B.t.u. units for burning in boilers. They are not suitable or use as fertilizer, for example as a land mulch, since the rice hulls have a silicon skeleton frame that prevents breaking down of the hull when mixed with the soil. Rice hulls are not suitable for feeding stock since they are very tough and springy, have sharp cutting edges and cannot be digested by livestock, such as cows. In addition, rice hulls have little if no nitrogen and equivalent protein content.

It would be highly desirable to convert the rice hulls into useful products for livestock feed, fertilizer, and to other useful products. The present invention is directed to a method of converting rice hulls into useful products and for useful products obtained from rice hulls.

It is therefore an object of the present invention to provide a method of treating rice hulls by which useful products are derived, for example, for livestock feed, fertilizer and other uses.

A further object of the present invention is the provision of a useful product derived by treating rice hulls with a gaseous nitrogen compound under superatmospheric pressure and temperature conditions.

Yet a further object of the present invention is the provision of a useful product, such as a livestock feed, fertilizer and the like derived by ammonating rice hulls.

In certain feeds for ruminants, up to one-third of the amount of protein of the feed is nitrogen from urea. When using urea, the ruminant first converts it in its first stomach into available ammonia which is then combined with non-nitrogeneous compounds in the building of bacterial protein. Further, in the digestive tract the bacteria are digested and the protein thus made available to the animal. Urea is in the form of hard crystals and is not uniformly distributed throughout the feed due to settling, shaking down in the bag and the like. It would be advantageous to provide a feed in which the conversion by the animal of urea to ammonia is eliminated and the available nitrogen is uniformly distributed and fixed throughout the feed. In an important aspect, the present invention is directed to such a feed and its process of manufacture of rice hulls.

A further object of the present invention is the provision of a livestock feed derived by ammoniating rice hulls.

Still a further object of the present invention is the provision of useful products derived from rice hulls by breaking down the silicon skeleton structure of the hulls.

Yet a further object of the present invention is the provision of such methods and products which include a relatively high nitrogen content.

Yet a further object of this invention is to chemically fix available nitrogen in the rice hulls so that it is not released during storage or extended periods of time and before use.

Still a further object of the present invention is to chemically fix the major portion of available nitrogen to the cellulose sites of the rice hulls so that in use after the initial release of a minor portion of the nitrogen there is a gradual release of the major portion of the nitrogen as the hulls decompose, such as during digestion as a feed or decomposition in the soil as a mulch or fertilizer.

Still a further object of the present invention is the provision of a treated rice hull having nitrogen chemically fixed to it which provides a satisfactory feed supplement as a protein roughage.

Still a further object of the present invention is the provision of a feed and fertilizer, and their method of manufacture, in which substantially completely water-soluble nitrogen is uniformly distributed and fixed throughout. It is yet a further object to provide the same in which the nitrogen is fixed by a suitable reactant which improves the mineral content of the feed and fertilizer.

Yet a further object of this invention is the provision of such a method which is relatively simple and inexpensive to perform and a feed or fertilizer which is inexpensively produced.

Other and further features, objects and advantages of the present invention will be apparent from the following description of presently preferred examples of the invention given for the purpose of disclosure.

The attainment of the foregoing objects, features and advantages is based upon the surprising discovery that by subjecting rice hulls under pressure and temperature to a bombardment of a nitrogen compound which is in a gaseous state under the temperature and pressure used, for example, gaseous ammonia, the rice hulls silicon skeleton frame is fractured thereby eliminating the sharp hulls and converting them into a relatively soft state so that they are in suitable state for a cattle stock feed as well as conditioning them so that they will disintegrate in the soil when applied as a fertilizer, mulch and the like.

For example, the rice hulls are preferably ground, such as in a hammer mill, and placed in a suitable enclosed mixer or pressure vessel which provides good contact between the hulls and a gaseous nitrogen compound, such an anhydrous ammonia. The rice hulls are then reacted with the gaseous nitrogen compound under superatmospheric pressure and temperature conditions for a period of time, preferably while agitating or tumbling the hulls, thereby chemically fixing the nitrogen to the hulls. The pressure is then released from the mixer or pressure vessel and the rice hulls are then discharged from this vessel. The product obtained is of a softer texture and contains more nitrogen than the original rice hulls. Furthermore, the major portion of the nitrogen compounds are not water soluble and cannot be purged from the solids with air at ambient temperatures but are chemically fixed to the rice hulls. Any time temperature-pressure relationship may be utilized which chemically fixes nitrogen to the rice hulls; however, for making a feed or feed supplement from the rice hulls, the time-temperature-pressure relationships should be such that the hulls are not charred.

Referring now to the drawing, hulls from the container or hopper 10 are placed by the line 12 in the enclosed bomb ammoniator 14 to which anhydrous ammonia gas by the line 16 and steam 18 are introduced through the common line 20 or may be introduced separately, as desired. Preferably, the rice hulls are preground to the desired size. The ammoniator may be a suitable, round steam-jacketed rotatable drum or a fixed reactor provided with suitable agitating and mixing means such as blades, paddles, wires, baffles and the like. After a relatively short period of time, the finished products are removed from the mixer or reactor to storage and may be used as cattle feed, fertilizer or other uses. If desired, the reactor may be cooled to condense available vapor before venting the pressure.

In general, the additional nitrogen fixed to the resulting hull product is increased by increasing the temperature, pressure or contact time with the nitrogen containing gas or any combination of these variables.

The pressures may range from as little as about 10 p.s.i.g. to in excess of 900 p.s.i.g. The temperatures may range from about 120° F. to in excess of 450° F. Any temperature below the charring temperature at the other selected conditions gives a product useful as a livestock feed. If the material is charred, it still may have value as a soil conditioner, mulch and fertilizer. The time of treatment will vary with the temperatures and pressures used and may vary from about 20 minutes to about 24 hours or more. Good results are obtained, however, by treating the rice hulls for about 30 minutes.

The ranges of pressure, temperature and time of treatment vary with the particular end product desired. For example, in using the end product as cattle feed it is desired to have a nitrogen content of not less than about 1.6% giving an equivalent protein content of 10%. A relatively low pressure and temperature of 250 p.s.i.g. and 350° F. for a period of about thirty minutes provides such nitrogen fixation and equivalent protein to the end product when using the proper amount of nitrogen-containing material and hence, is presently preferred.

Preferably the nitrogen containing material should be a gas. The presently-preferred compound is anhydrous ammonia gas. It is only necessary, however, that the fluid be in a gaseous state at the temperature and pressure used. Thus, liquid ammonia may be used. Other nitrogen compounds which may be used are the derivatives of ammonia, which are the amines and the amides. Any of the alkyl derivatives of ammonia, the amines, may be used, for example the primary, secondary or tertiary amines. Similarly, the acyl derivatives of ammonia may be used, for example, formamide, acetamide, carbamide, propionamide, butyramide and the like.

Slightly in excess of stoichiometric amounts of the nitrogen containing material may be used for the amount that reacts with the hulls. Thus, in practice, slightly in excess of these stoichiometric amounts may be used which eliminates the need for a recovery system for the nitrogen containing material or compound.

If desired, various additives may be added to the rice hulls before, after or during treatment. For example, in using the treated hulls as a cattle feed, molasses, salt and calcium may be added after treatment. Some of these same ingredients such as calcium and phosphorus may be added during treatment. For example, monocalcium phosphate was added during several runs and the material produced gave very satisfactory results when used in animal feeding tests. Fat may be added after treatment to avoid the formation of soap by saponification of the fat. For example, the vegetable oils, such as cottonseed oil, soybean oil and the like are satisfactory. Ordinarily, 2% fat is added after treatment so the feed contains that amount of fat.

The following specific examples are given to illustrate various examples of the present invention and are not to be regarded as limitations thereof, many variations of which are possible without departing from its spirit or scope. In the following examples, all percentages are based on weight.

EXAMPLE I

Rice hulls were ground in a hammer mill and the ground rice hulls were placed in a steam jacketed rotatable bomb provided with internal baffles for agitating the rice hulls. The bomb was revolved from about 20 to about 30 r.p.m. and anhydrous ammonia gas was introduced at the rate of 10 pounds per 100 pounds of rice hulls. This introduced about 1.6 pounds of nitrogen to the rice hulls. The pressure was held at 250 p.s.i.g. and at a temperature of 350° F. for a period of 25 minutes. The rice hulls were then removed from the bomb. The hulls were screened by passing over a 120 mesh screen to remove powder. About 5 ounces of powder was removed per 100 pounds of hulls.

The resulting ammoniated rice hulls were substantially dry, had about 4% moisture content and had a nitrogen content of 1.8 giving an equal or equivalent protein content of 11.2%. The treated hulls were relatively soft and had no sharp cutting edges or silicon frame.

EXAMPLE II

In this example the ground rice hulls were treated as in Example I except that the pressure was maintained at 10 p.s.i.g. and the temperature was 355° F. The resulting rice hulls were then screened and were substantially dry having a moisture content of about 4%. The nitrogen content was 1.0 giving an equal or equivalent protein content of 6.5%.

EXAMPLE III

In this example, the rice hulls were treated as in Examples I and II except that the pressure was maintained at 30 p.s.i.g. and the temperature was 355° F. The resulting rice hulls were then screened to remove silicon powder and were substantially dry. The nitrogen content was 1.3 giving an equal or equivalent protein content of 8.5%.

EXAMPLE IV

In this example the rice hulls were unground and were treated as in Examples I, II and III. The resulting hulls were relatively soft and the silicon skeleton of the hulls was broken down. The resulting hulls had the same nitrogen content as those of Examples I, II and III.

EXAMPLE V

In this example the rice hulls were treated as in Examples I–IV, inclusive, except that liquid ammonia was substituted for anhydrous ammonia gas. The results were the same as in the previous examples.

EXAMPLE VI

In this example the rice hulls were treated the same as in Examples I–IV, inclusive, except that methylamine, dimethylamine and trimethylamine were each substituted for anhydrous ammonia gas with satisfactory results.

EXAMPLE VII

In this example the rice hulls were treated the same as in Examples I–IV, inclusive, except that formamide, acetamide, propionamide and butyramide were substituted for anhydrous ammonia gas with satisfactory results.

EXAMPLE VIII

In this example, 1780 pounds of rice hulls (89%) were placed in the treater as in Example I. The treater was rotated at 30 to 35 r.p.m., 70 pounds of anhydrous ammonia gas was added and steam was added. The temperature was maintained at 350° F. and at a pressure of 250 p.s.i.g. for a period of 40 minutes. The resulting product was screened to remove dust from the hulls, the resulting product had a 12% protein equivalent in the form of fixed nitrogen. To this was added 200 pounds of molasses (10%), 14 pounds of salt (0.7%) and 6 pounds of calcium (0.3%) and was thoroughly mixed. This provided a satisfactory cattle feed.

EXAMPLE IX

The amount of nitrogen affixed and therefore the equivalent protein may be varied according to the amount of nitrogen compound added, and by the pressures and temperatures used. The following chart illustrates examples in which varying amounts of nitrogen were fixed to the rice hulls. In the following Table I the percentages were added to 100 pounds of hulls.

TABLE I

| Added Ammonia NH₃ Percentage | Equivalent Protein Nitrogen Determination Percentage | Pressure, p.s.i.g. | Temperature, °F. | Time in Minutes |
|---|---|---|---|---|
| 4.0 | 7.1 | 75 | 225 | 30 |
| 4.0 | 7.7 | 100 | 275 | 40 |
| 10.0 | 10.4 | 210 | 320 | 30 |
| 10.0 | 12.3 | 250 | 350 | 30 |
| 10.0 | 12.4 | 280 | 390 | 30 |

All of the above were highly suitable as cattle feed, fertilizer and the like.

EXAMPLE X

In order to fix and stabilize the nitrogen to the materials, a suitable fixative is used. For example, for feeds an acid phosphate, such as monocalcium phosphate, is satisfactory which results in improved mineral content as well as improved nitrogen value. Any satisfactory amount may be used, for example, 1% monocalcium phosphate added during treatment in the preceding examples and Table I had the nitrogen fixed and stabilized preventing it from being released during storage and before use.

In the case of fertilizer, and not feeds, 1% phosphoric acid added during treatment in the preceding examples and Table I resulted in preventing premature release of the nitrogen. In fertilizers, additional amounts may be used to increase that content of phosphoric acid as desired.

Thus, any suitable non-toxic fixative for feeds and other fixative for fertilizers may be used which prevents premature or early release of nitrogen from the treated hulls.

EXAMPLE XI

As previously mentioned, the pressures and temperatures may vary from very low to as high as desired. Generally, low temperatures and pressures require a longer time of treatment. Thus, pressures and temperatures of the order of 10 p.s.i.g. and 120° F. are treated about 24 hours. High pressures and temperatures require considerably less time, for example, pressures and temperatures of the order of and in excess of 450 p.s.i.g. and 300° F. require short times, for example, 20 minutes. The higher pressures and temperatures, however, discolor or tend to char the hulls. Satisfactory results are obtained, however, at these elevated pressures and temperatures.

In all of the preceding examples, the resulting products had the silicon skeleton of the rice hulls broken down, and the hulls were relatively soft products which were useful for the purposes set forth. It is therefore seen that useful products are obtained by a relatively simple and inexpensive process.

EXAMPLE XII

A series of controlled experiments were conducted to determine the usefulness of ammoniated rice hulls as a ruminant feed. These included toxicity trials, metabolism trials, and cattle feeding trials. In all of these trials ammoniated rice hulls were used having about 10.5% equivalent protein and about 45% fiber and made according to Example I.

Toxicity trials

In these trials the ammoniated rice hulls were compared with urea. Four sheep receiving 20 to 30 gm. urea per 100 lb. body weight showed muscular tremors and incoordination 10 to 15 minutes after drenching. Three of these animals were down and in a coma within thirty minutes and died approximately sixty minutes after the injection of urea. One animal receiving 20 gm. urea per 100 lb. survived. Levels of ammoniated rice hulls equivalent to 30 gm. of urea per 100 lb. were nontoxic and none of the symptoms associated with ammonia toxicity were evident. Higher levels of ammoniated rice hulls were not tested because of the difficulty of administering the bulk material. There was a tendency for less rise in blood ammonia of the sheep when ammoniated rice hulls where administered as compared to equivalent amounts of urea. These tests indicate that ammoniated rice hulls are less toxic than urea on an isonitrogeneous basis because they do not cause as large an increase in blood N—NH.

Metabolism trials

Twelve mature wethers averaging 77 pounds were divided into two groups of six and placed in metabolism stalls. A ten day collection period followed a fourteen day preliminary period. The composition of the rations is shown in Table 2.

TABLE 2.—COMPOSITION OF RATIONS USED IN DIGESTION TRIAL

| Ingredient | Control Ration, percent | Ammoniated Rice Hull Ration, percent |
|---|---|---|
| Ground Milo | 58.5 | 59.0 |
| Cottonseed Hulls | 29.8 | |
| Ammoniated Rice Hulls | | 30.0 |
| Molasses | 9.9 | 10.0 |
| Urea | 0.8 | |
| Vitamin-mineral | 1.0 | 1.0 |

The rations are isonitrogeneous with urea in the control ration and the ammoniated rice hulls in the experimental ration supplied approximately 34% of the total nitrogen.

Table 3 shows the results of the metabolism trial.

TABLE 3.—DIGESTIBILITY OF RATION COMPONENTS AND RETENTION OF NITROGEN PERCENT BY SHEEP FED AMMONIATED RICE HULL OR CONTROL RATIONS

| Treatment | Dry Matter | Organic Matter | Protein | Ether Extract | Crude Fiber | N.F.E. | Energy | Percent Nitrogen Retained |
|---|---|---|---|---|---|---|---|---|
| Ammoniated rice hulls | 64.94 | 70.34 | 69.09 | 81.73 | 17.42 | 84.72 | 67.78 | 32.24 |
| Control | 73.90 | 74.91 | 48.03 | 87.58 | 45.22 | 84.89 | 71.83 | 27.76 |

It is seen from Table 3 that the crude protein digestibility was greater with the ammoniated rice hull ration. The percentage nitrogen retention of the ammoniated rice hull ration was 32.24 and of the control was 27.76 which difference approaches significance.

The lower blood NH₃ levels in the toxicity trails of ammoniated rice hulls with urea can therefore be interpreted as evidence that NH₃ from the ammoniated rice hulls is released at a slower rate than from urea. Release of ruminal NH₃ at a rapid rate does not permit efficient utilization of the NH₃ by the rumen bacteria and is undesirable. While applicant does not desire to be bound by any theory, the improvement of nitrogen digestion and retention in the ammoniated rice hulls ration is believed to be a result of the slower rate of NH₃ release which permits efficient bacterial utilization of the NPN.

Cattle feeding trial

In the cattle feeding trial thirty-six yearling cross-bred steers averaging 641 pounds were allotted on the basis of weight and condition into four groups of nine each. The steers were implanted with 24 mg. of diethylstilbestrol. A 10 day preliminary period to allow the animals to adjust to their rations was followed by a 120 day experimental period. The rations used are shown in Table 4 and they were fed ad libitum.

TABLE 4.—COMPOSITION OF RATIONS USED IN STEER FEEDING TRIAL

| Feed | Per Cent of each ingredient | | | |
|---|---|---|---|---|
| | 10% ARH | 20% ARH | 30% ARH | Control |
| Ration number | 1 | 2 | 3 | 4 |
| Milo | 77 | 67 | 57 | 63 |
| Ammoniated rice hulls (ARH) | 10 | 20 | 30 | |
| Cottonseed hulls | | | | 20 |
| Cottonseed meal | 5 | 5 | 5 | 9 |
| Molasses | 5 | 5 | 5 | 5 |
| Animal fat | 2 | 2 | 2 | 2 |
| Vitamin-mineral mix | 1 | 1 | 1 | 1 |
| Approximate protein content, percent | 10.9 | 10.9 | 10.9 | 10.8 |

It is noted from Table 4 that rations 1, 2 and 3, contain 10, 20 and 30% of the ammoniated rice hulls, respectively. Ration 4 contained 20% cottonseed hulls and served as the control ration. After an overnight shrink, steers were weighed initially and at fourteen day intervals during the trial. When the trial was terminated, the steers were slaughtered and carcass grade dressing percent were determined. This trial was designed to compare a fattening ration containing ammoniated rice hulls and a comparable control ration and also to determine the optimum level of ammoniated rice hulls in a ration of this type. Results of the fattening trial are presented in Table 5.

TABLE 5.—PERFORMANCE OF ANIMALS IN STEER FEEDING TRIAL

| | Ammoniated Ricehulls | | | Control |
|---|---|---|---|---|
| | 10% | 20% | 30% | |
| Lot number | 1 | 2 | 3 | 4 |
| Number animals | 9 | 8 | 9 | 9 |
| Number days | 120 | 120 | 120 | 120 |
| Average selling weight | 1,002 | 998 | 913 | 987 |
| Average daily gain (lb.) | 2.98 | 2.93 | 2.35 | 2.88 |
| Feed efficiency (lb. feed/lb. gain) | 7.53 | 7.67 | 9.37 | 9.54 |
| Average daily feed intake (lb.) | 22.44 | 22.50 | 22.00 | 27.44 |
| Average daily feed intake (percent body wt.) | 2.55 | 2.55 | 2.78 | 3.18 |
| Carcass Data: | | | | |
| Average carcass weight | 630.4 | 601.0 | 541.6 | 613.7 |
| Average dressing percentage | 62.91 | 60.22 | 59.32 | 62.18 |
| Carcass grade: | | | | |
| Standard | 1 | | 5 | |
| Good | 8 | 8 | 4 | 8 |
| Choice | | | | 1 |

From Table 5 it is noted that steers fed rations 1 and 2 had increased gains over steers fed ration 4, that steers fed the ammoniated rice hull rations consumed approximately 20% less feed per day than the control ration and that the carcasses of steers receiving rations of the 10 and 20% ammoniated rice hull rations and the control ration were substantially the same.

The full report of these trials is set forth in the official report of Texas A & M College, by Dr. K. S. Eng., Jr., and appears in the February 1, 1964 issue of Feedstuffs, volume 36, No. 5 and in Feedlot, February 1964, beginning at page 30.

It should be noted, however, that higher percentages of ammoniated rise hulls may be included into feeds. For example, about ⅓ of the total ration of ammoniated rice hulls having 45% fiber and about 10½% equivalent protein have been successfully included in range cubes with very satisfactory results. The following are typical rations for various purposes incorporating rice hulls treated according to Example I and having approximately 10.5% equivalent protein and about 45% fiber.

TABLE 6.—CATTLE FATTENING RATION

| Ration | #1 | | #2 | | #3 | |
|---|---|---|---|---|---|---|
| | Percent | Lb./ton | Percent | Lb./ton | Percent | Lb./ton |
| Milo or corn | 24.5 | 490 | 61 | 1,220 | 72 | 1,440 |
| Ammoniated rice hulls | 20 | 400 | 20 | 400 | 10 | 200 |
| Cottonseed hulls | 30 | 600 | | | | |
| Cottonseed meal | 14.5 | 290 | 8 | 160 | 7 | 140 |
| Molasses | 5 | 100 | 5 | 100 | 5 | 100 |
| Dehydrated alfalfa | 3 | 60 | 3 | 60 | 3 | 60 |
| Fat | 2 | 40 | 2 | 40 | 2 | 40 |
| Vitamins-minerals | 1 | 20 | 1 | 20 | 1 | 20 |

Ration #1 contains approximately 12.0% protein and should be fed for the first 15 days.
Ration #2 contains approximately 11.5% protein.
Ration #3 contains approximately 11.0% protein and the cattle should be finished on this ration.

TABLE 7.—CATTLE FATTENING RATIONS INCLUDING SILAGE

| Ration | #1 | #2 | #3 | #4 |
|---|---|---|---|---|
| Ammoniated rice hulls | 400 | 400 | 300 | 300 |
| Cottonseed hulls | 500 | | | |
| Silage [1] | 100 | 300 | 300 | 100 |
| Rolled Milo | 400 | 890 | 1,010 | 1,340 |
| 30% Protein Supplement | 400 | 250 | 230 | 200 |
| Alfalfa Pellets | 100 | 100 | 100 | |
| Fat | 40 | 40 | 40 | 40 |
| Salt and Minerals | 20 | 20 | 20 | 20 |
| Total lbs | 2,000 | 2,000 | 2,000 | 2,000 |
| Crude Protein, percent | 12.2 | 11.8 | 11.5 | 11.1 |
| NPN Equivalent: | | | | |
| (a) Urea, percent | 1.3 | 0.8 | 0.75 | 0.65 |
| (b) Ammoniated rice hulls | 1.6 | 1.6 | 1.2 | 1.2 |
| Dig. Protein, percent | 8.6 | 8.7 | 8.5 | 8.4 |
| Total Dig. Nut., percent | 53.7 | 61.6 | 64.7 | 69.0 |

[1] Contribution of silage has been calculated on a dry-basis, estimating from a 3 wet to 1 dry ratio. Therefore, actual silage incorporated in the mixing rations would be three times the above figure.

TABLE 8.—11% PROTEIN BULL AND HEIFER GROWTH FEED

| | Lbs. |
|---|---|
| Cracked milo | 860 |
| Crimped oats | 300 |
| Dehy. alfalfa pellets | 50 |
| Cottonseed meal | 100 |
| Ammoniated rice hulls | 500 |
| Molasses | 150 |
| Defluorinated phosphate | 10 |
| Salt | 20 |
| Vitamin pre-mix (vitamin and trace minerals) | 4 |
| | 1994 |

TABLE 9.—14% PROTEIN CREEP FEED

| | Lbs. |
|---|---|
| Cracked milo | 780 |
| Crimped oats | 500 |
| Dehy. alfalfa pellets | 50 |
| Cottonseed meal | 280 |
| Ammoniated rice hulls | 200 |
| Molasses | 150 |
| Defluorinated phosphate | 10 |
| Salt | 20 |
| Vitamin pre-mix (vitamin and trace minerals) | 4 |
| | 1994 |

TABLE 10.—CATTLE WINTERING RATIONS

| Ration | #1 Percent | #1 Lb./ton | #2 Percent | #2 Lb./ton | #3 Percent | #3 Lb./ton |
|---|---|---|---|---|---|---|
| Milo or corn | 52 | 1,040 | 72 | 1,440 | 26.5 | 530 |
| Ammoniated rice hulls | 15 | 300 | 20 | 400 | 20 | 400 |
| Cottonseed hulls | | | | | 30 | 600 |
| Cottonseed meal | 17 | 340 | 2 | 40 | 7.5 | 150 |
| Dehydrated alfalfa | 10 | 200 | | | 10 | 200 |
| Molasses | 5 | 100 | 5 | 100 | 5 | 100 |
| Vitamins-Minerals | 1 | 20 | 1 | 20 | 1 | 20 |

Ration #1 contains approximately 15.1% protein and is to be fed with poor quality roughage.
Ration #2 contains approximately 9.5% protein and is to be fed with good quality legume roughage.
Ration #3 contains approximately 10.5% protein and is a complete feed.

TABLE 11.—20% RANGE CUBES

Ingredients: Lbs.
- Ammoniated rice hulls — 400
- Corn chops — 100
- Ground milo — 515
- Wheat shorts/midds — 250
- 17% dehy. alfalfa meal — 50
- Cottonseed meal — 400
- Urea — 35
- Molasses — 150
- Defluorinated phosphate — 10
- Calcium carbonate — 10
- Salt — 20
- Pre-mix (vitamin and trace minerals) — 10
- Bentonite/Durabond — 50

Total — 2000

Analysis: Pounds, percent
- Crude protein — 20.4
- Fat — 2.3
- Fiber — 13.6
- Dig. pro. — 15.9
- Tot. dig. nutrients — 57.3
- Calcium — 0.63
- Phosphorus — 0.60

TABLE 12.—LAMB FATTENING RATIONS

| Ingredients | Starter, Lbs. | Finisher, Lbs. |
|---|---|---|
| Ammoniated Rice hulls | 400 | 400 |
| Cottonseed hulls | 300 | |
| Dehy. Alfalfa meal | 150 | 150 |
| Ground milo | 950 | 1,300 |
| Cottonseed meal | 75 | 25 |
| Molasses | 100 | 100 |
| Phosphate | 10 | 10 |
| Salt | 15 | 15 |
| Vit. and Trace Min. | 5 | 5 |
| Totals | 2,000 | 2,000 |
| Estimated Analysis, Percent: | | |
| Crude Protein | 10.0 | 10.1 |
| Dig. Protein | 6.9 | 7.3 |
| Tot. Dig. Nutrients | 57.6 | 63.2 |
| Calcium | 0.39 | 0.36 |
| Phosphorus | 0.33 | 0.34 |

TABLE 13.—LAMB WINTERING RATIONS AND SUPPLEMENTS

| Ingredients | Complete Dry-lot, Lbs. | Controlled Supplement, Lbs. | Self-fed Salt and Meal, Lbs. |
|---|---|---|---|
| Ammoniated Rice hulls | 500 | 400 | 200 |
| Dehy. Alfalfa Meal | 200 | 100 | 100 |
| Ground Milo | 725 | 1,000 | 370 |
| Cottonseed Hulls | 400 | | |
| Cottonseed Meal | | 300 | 550 |
| Molasses | 150 | 150 | 150 |
| Phosphate | 10 | 20 | 20 |
| Salt | 10 | 20 | 600 |
| Vit. and Trace Min. Pre-mix | 5 | 10 | 10 |
| Totals | 2,000 | 2,000 | 2,000 |
| Estimated Analysis, Percent: | | | |
| Crude Protein | 8.5 | 14.0 | 15.1 |
| Dig. Protein | 5.4 | 10.5 | 11.7 |
| Tot. Dig. Nutrients | 51.7 | 60.7 | 42.0 |
| Calcium | 0.41 | 0.50 | 0.51 |
| Phosphorus | 0.26 | 0.52 | 0.57 |
| Salt | 0.50 | 1.00 | 30.0 |

TABLE 14.—VARIABLE PROTEIN SUPPLEMENTS FOR LIMITED ROUGHAGE FEEDS

| Ingredients | 14% Protein Form A, Lbs. | 14% Protein Form B, Lbs. | 16% Protein Form A, Lbs. | 16% Protein Form B, Lbs. | 18% Protein Form A, Lbs. | 18% Protein Form B, Lbs. |
|---|---|---|---|---|---|---|
| Ammoniated Rice hulls | 350 | 250 | 300 | 200 | 250 | 150 |
| Rolled Oats/Barley | 200 | 500 | 200 | 500 | 200 | 400 |
| Ground Milo | 870 | 320 | 780 | 230 | 690 | 215 |
| Ground Ear Corn | | 300 | | 300 | | 300 |
| Wheat Bran | | 50 | | 50 | | 100 |
| Dehy. Alfalfa Meal | 100 | 100 | 100 | 100 | 100 | 100 |
| Cottonseed Meal | 300 | 300 | 425 | 425 | 550 | 525 |
| Molasses | 150 | 150 | 150 | 150 | 150 | 150 |
| Salt | 10 | 10 | 15 | 15 | 20 | 20 |
| Phosphate | 5 | 5 | 7.5 | 7.5 | 10 | 10 |
| Calcium Carbonate | 5 | 5 | 7.5 | 7.5 | 10 | 10 |
| Vit. and Trace Min. Pre-mix | 10 | 10 | 15 | 15 | 20 | 20 |
| Totals | 2,000 | 2,000 | 2,000 | 2,000 | 2,000 | 2,000 |
| Estimated Analysis, percent: | | | | | | |
| Crude Protein | 14.4 | 14.6 | 16.3 | 16.5 | 18.2 | 18.2 |
| Digestible Protein | 11.0 | 11.1 | 12.5 | 12.7 | 14.1 | 14.0 |
| Total Dig. Nutrients | 62.7 | 62.7 | 62.7 | 62.8 | 63.3 | 63.5 |
| Calcium | 0.35 | 0.36 | 0.44 | 0.46 | 0.56 | 0.57 |
| Phosphorus | 0.42 | 0.43 | 0.49 | 0.50 | 0.57 | 0.59 |

TABLE 15.—COMPLETE DAIRY CATTLE FEED

| Ingredients: | Lbs. |
|---|---|
| Ammoniated rice hulls | 500 |
| Ground milo | 765 |
| Ground ear corn | 400 |
| Dehy. alfalfa meal | 100 |
| Cottonseed meal | 60 |
| Molasses | 150 |
| Salt | 10 |
| Phosphate | 10 |
| Vit. and trace minerals | 5 |
| Total | 2000 |

| Estimated analysis: | Pounds, percent |
|---|---|
| Crude Protein | 10.2 |
| Digestible protein | 6.9 |
| Tot. dig. nutrients | 53.0 |
| Calcium | 0.33 |
| Phosphorus | 0.34 |

As previously mentioned, the foregoing feeds in Tables 6–15, inclusive, are typical feeds utilizing various amounts of ammoniated rice hulls according to the present invention in a variety of feeds. The amount of these ammoniated rice hulls and the other feed components will vary with the feed materials available in the area and the desired end product and its use.

Good results have been obtained by utilizing rice hulls according to this invention as a mulch, soil conditioner and a fertilizer. In controlled experiments the ammoniated rice hulls had very good water retention, for example, a water retention comparable to peat moss. In addition, a minor portion of the nitrogen is water soluble, for example, of the order of about 20%, and the balance is released slowly as the treated rice hulls deteriorate or decompose providing a slow release of nutrients, that is, nitrogen, to the soil. Thus, heavy rainfall and the like do not cause the treated rice hulls and nitrogen to be leached away as in the case of fertilizers which are predominately water soluble.

The present invention therefore is well suited and adapted to attain the objects and ends and has the advantages mentioned as well as others inherent therein.

While various embodiments of the invention have been given for the purpose of disclosure, changes may be made therein which are within the spirit of the invention and the scope of the appended claims.

What is claimed is:

1. Ammoniated rice hull.
2. Ammoniated rice hull having a nitrogen content of at least 1.1%.
3. Rice hulls having nitrogen chemically fixed thereto as equivalent protein in an amount to bring their crude protein content to at least as much as about 10%, said nitrogen being utilizable for nutritional purposes.
4. Rice hulls having ammonia fixed thereto, a minor portion of the nitrogen of which is water soluble and the remainder of which is water insoluble.
5. Rice hulls having ammonia fixed thereto, not over 25% of the nitrogen of which is water soluble.
6. A reaction product of rice hulls and a compound selected from the group consisting of ammonia, amines and amides.
7. A reaction product of rice hulls and a compound in gaseous state selected from the group consisting of ammonia, amines and amides.
8. The reaction product of claim 7 where nitrogen fixed to the rice hulls has a minor portion which is water insoluble and a major portion which is water soluble.
9. The reaction product of claim 7 where not over 25% of nitrogen fixed to the rice hulls is water soluble.
10. A feed comprising rice hulls having nitrogen fixed thereto as equivalent protein and the remainder of the feed being feed material.
11. The feed of claim 10 where the rice hulls comprise up to about ⅓ of the feed based on the total weight of the feed.
12. The feed of claim 10 where the rice hulls comprise up to about 20% of the feed based on the total weight of the feed.
13. A feed comprising ammoniated rice hulls and the remainder of the feed being feed material.
14. The feed of claim 13 where the ammoniated rice hulls comprise up to about ⅓ of the feed based on the total weight of the feed.
15. The feed of claim 13 wherein the ammoniated rice hulls comprise up to about 20% of the feed based on the total weight of the feed.
16. A method of preparing useful products from rice hulls which includes the step of reacting the rice hulls with a nitrogen compound in gaseous state under conditions of reaction.
17. The method of claim 16 where the nitrogen compound is selected from the group consisting of ammonia, amines and amides.
18. The method of claim 17 where the nitrogen compound is ammonia.
19. A method of preparing a useful product from rice hulls which includes the step of reacting said rice hulls with a nitrogen compound in gaseous state under superatmospheric pressure and temperature conditions.
20. The method of claim 19 where the reacting under superatmospheric pressure and temperature conditions is for a period of time sufficient to fix nitrogen to the rice hulls with a minor portion of the nitrogen being water soluble and a major portion thereof being water insoluble without charring the rice hulls.
21. The method of claim 19 where the nitrogen compound is selected from the group consisting of ammonia, amines and amides.
22. The method of claim 19 where the reacting is in the presence of a nitrogen fixative.
23. The method of claim 19 where the nitrogen compound is selected from the group consisting of ammonia, amines and amides and the reacting is in the presence of a nitrogen fixative.
24. The method of claim 19 where the pressure and the temperature are maintained for a period of time sufficient to fix nitrogen to the rice hulls with a minor portion of the nitrogen water soluble and the remainder thereof being water insoluble.
25. A method of preparing a useful product from rice hulls comprising reacting said rice hulls with a nitrogen compound in gaseous state at a pressure within the range of from about 10 p.s.i.g. to about 900 p.s.i.g., at a temperature within the range of from about 120° F. to about 450° F., for a period of time within the range of about 20 minutes to about 24 hours.
26. The method of claim 25 where the nitrogen compound is selected from the group consisting of ammonia, amines and amides.
27. A method of preparing a useful product from rice hulls which includes the step of reacting the rice hulls in a closed container with a compound selected from the group consisting of ammonia, amines and amides, said compound being in gaseous state during such reacting, at a temperature of the order of about 350° F. for a period of from about 25 minutes to about 40 minutes.
28. The method of claim 27 where the reacting is in the presence of a nitrogen fixative.
29. The method of claim 27 where the compound is present slightly in excess of a stoichiometric amount which reacts with the rice hulls.

(References on following page)

References Cited by the Examiner

UNITED STATES PATENTS

| | | | |
|---|---|---|---|
| 1,588,335 | 6/1926 | Puttaert et al. | 162—99 |
| 1,891,337 | 12/1932 | Seaman | 162—99 |
| 2,027,766 | 1/1936 | Davis et al. | 71—23 |
| 2,293,845 | 8/1942 | Millar | 99—2 |
| 2,789,906 | 4/1957 | Zick | 99—2 |
| 2,904,435 | 9/1959 | Kruse | 99—2 |
| 2,964,518 | 12/1960 | Snyder | 162—63 |
| 3,130,115 | 4/1964 | Thomsen | 162—81 |

OTHER REFERENCES

Brauns, The Chemistry of Lignin, supplement volume, p. 306, Academic Press, New York, N.Y. (1960.)

Morrison et al.: Feeds and Feeding, N.Y., The Morrison Pub. Co., 22nd edition, 1957, p. 458.

A. LOUIS MONACELL, *Primary Examiner.*

D. J. DONOVAN, *Assistant Examiner.*